United States Patent [19]
Kajiwara et al.

[11] Patent Number: 4,936,364
[45] Date of Patent: Jun. 26, 1990

[54] LOW-NOISE TIRE

[75] Inventors: Shinzo Kajiwara; Kaoru Furubayashi, both of Hyogo, Japan

[73] Assignee: Sumitomo Rubbert Industries, Ltd., Hyogo, Japan

[21] Appl. No.: 837,257

[22] Filed: Mar. 7, 1986

[51] Int. Cl.$^5$ ............................................. B60C 11/11
[52] U.S. Cl. ............................. 152/209 A; 152/209 R
[58] Field of Search ............ 152/209 R, 209 D, 209 A

[56] References Cited

U.S. PATENT DOCUMENTS

| 1,956,011 | 4/1934 | Evans | 152/209 R |
| 2,006,197 | 6/1935 | Ewart et al. | 152/209 R |
| 3,023,798 | 3/1962 | Moore et al. | 152/209 R |
| 3,217,776 | 11/1965 | Ellenrieder et al. | 152/209 A |
| 3,286,756 | 11/1966 | Ellenrieder et al. | 152/209 A |

FOREIGN PATENT DOCUMENTS 197810 10/1978 Fed. Rep. of Germany ... 152/209 D

OTHER PUBLICATIONS

M. G. Richards, "Automotive Tire Noise—A Comprehensive Study", Sound and Vibration, May 1974, pp. 42–47.

Primary Examiner—David Simmons
Assistant Examiner—Geoffrey L. Knarle
Attorney, Agent, or Firm—Birch, Stewart, Kolasch & Birch

[57] ABSTRACT

A low-noise tire which comprising a plurality of block lines which run in the circumferential direction of the tire. The block lines include a basic block line made up of unit blocks arranged at a uniform pitch in the circumferential direction of the tire and phase-difference block lines each made up of unit blocks arranged such that the phase in the circumferential direction is shifted with respect to that of the unit blocks in the basic block line. The phase difference varies from one unit block to the adjacent one in the circumferential direction. The length of the unit block in the basic block line is smaller than that of the unit block in the phase-difference block line.

4 Claims, 4 Drawing Sheets

LOW-NOISE TIRE

BACKGROUND OF THE INVENTION

The present invention relates to tires for motorcycles, passenger cars, trucks, and buses which, as compared with conventional ones, generate less noise when they come into contact with the road.

The tread of conventional tires has a pattern consisting of design elements or unit blocks which continuously repeat in the circumferential direction of the tire. This tread pattern causes air in the groove of the tread to be compressed and relieved as the tire turns. The repeated compression and relief of air form the compressional wave of air which makes audible pattern noise or impacting noise. This noise becomes amplified when it resonates with some parts of the vehicle. It is known that this kind of noise can be reduced when the noise frequency is distributed over a broad range and the resonance is prevented. This is accomplished by changing the tread design such that the repeating consitituent units are arranged at varied pitches. This is known as the variable pitch method. According to this method, the design elements are arranged in the circumferential direction of the tire at several different pitches, so that the time interval of pulse noise or vibration is changed and noise of a specific frequency is not generated when the tire comes into contact with the road and leaves the road. However, the variable pitch method is not necessarily satisfactory. Even though the variable pitches for the design elements are properly dispersed according to the frequency modulation theory, they do not reduce the sound pressure energy per se. Moreover, if the difference between the longest pitch and the shortest pitch is excessively great, the individual design elements differ in stiffness. This, in turn, adversely affects the vibration characteristics of the rotating tire and causes uneven wear and abrasion. It is also known that if the variable pitches are arranged regularly in a specific manner, the tire generates noise offensive to the ear.

OBJECT AND SUMMARY OF THE INVENTION

It is an object of the present invention to provide a low-noise tire which has a decreased low noise level, solving the above-mentioned problems without sacrificing the fundamental characteristics of the tire tread such as resistance to uneven wear and abrasion.

The gist of the invention resides in a low-noise tire which comprises a plurality of block lines which run in the circumferential direction of the tire, said block lines including a basic block line made up of unit blocks arranged at a uniform pitch in the circumferential direction of the tire and phase-difference block lines each made up of unit blocks arranged such that the phase in the circumferential direction is shifted with respect to that of the unit blocks in said basic block line, the phase difference varying from one unit block to the adjacent one in the circumferential direction, the length of the unit block in said basic block line being smaller than that of the unit block in said phase-difference block line.

The invention is now described with reference to the drawing illustrating one example of the invention.

DETAILED DESCRIPTION OF THE PREFERRED EMBODIMENTS

Figure 1:
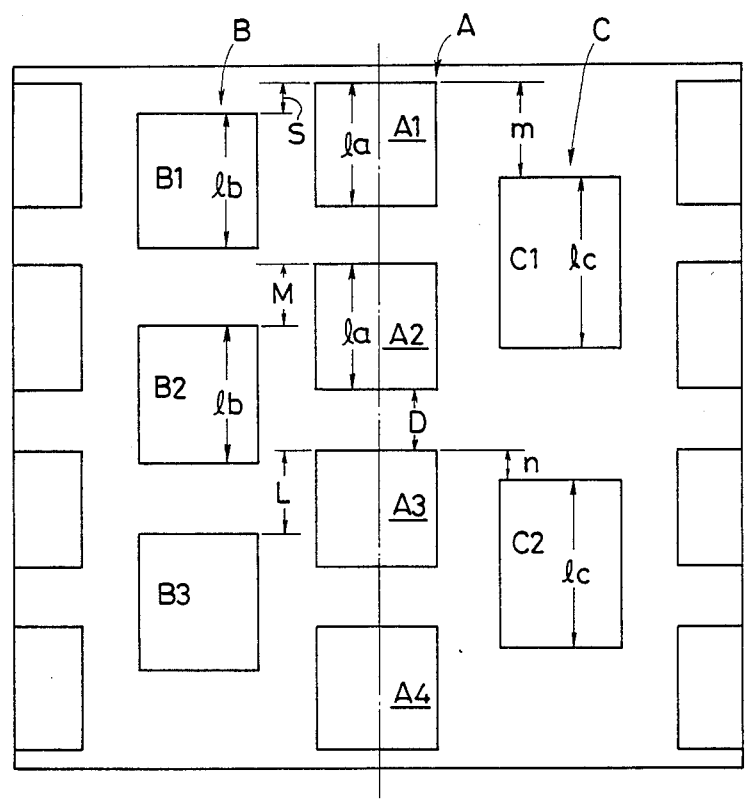
FIGS. 1 and 2 are partial plan views of the tread of the tire of this invention.

FIG. 1 shows a tread pattern composed of a basic block line (A) and phase-difference block lines (B and C) placed on both sides of the basic block line. The basic block line is made up of unit blocks (A1, A2, A3 ...) which are arranged at a uniform pitch along the equator of the tire. Each of the phase-difference block lines is made up of unit blocks which are shifted in the circumferential direction with respect to the individual unit blocks in the basic block line. The unit block (B1) in the phase-difference block line (B) is shifted or offset by S in the circumferential direction with respect to the unit block A1 in the adjacent basic block line (A). The unit block (B2) is shifted by M in the circumferential direction with respect to the unit block (A2) in the adjacent basic block line (A). Furthermore, the unit block (B3) is shifted by L in the circumferential direction with respect to the unit block (A3) in the basic line (A) in the same manner as mentioned above. A relationship of $S<M<L$ is established among the shifts, and these three different shifts are repeated regularly or randomly in the circumferential direction. On the other hand, the unit block (C1) constituting the phase-difference block line (C) is shifted by m with respect to the unit block (A1) in the basic block line; and the unit block (C2) is shifted by n with respect to the unit block (A3). m and n should not be the same, and it is also possible to provide unit blocks having a phase difference which is different from m and n.

The arrangement of the phase-difference block lines on both sides of the basic block line permits the blocks to come into contact with the road rather randomly. Three kinds of shifts are used in the phase-difference block line (B) as mentioned above; but two kinds of shifts or more than three kinds of shifts may be used as required. The length (lc) of the individual blocks (C1, C2) in the phase-difference line (C) may be greater than the length (la) in the circumferential direction of the unit block (An) in the basic block line. In this case, the tread will be improved in wear resistance. Table 1 below shows the actual dimensions employed for a 4.60–18 tire.

TABLE 1

| | | |
|---|---|---|
| Basic block line A | la | 25 mm |
| Groove distance | D | 15 mm |
| Phase-difference block line B | lb | 28 mm |
| | S | 5 mm |
| | M | 10 mm |
| | L | 15 mm |
| Phase-difference block line C | lc | 33 mm |
| | m | 15 mm |
| | n | 5 mm |

Figure 2:
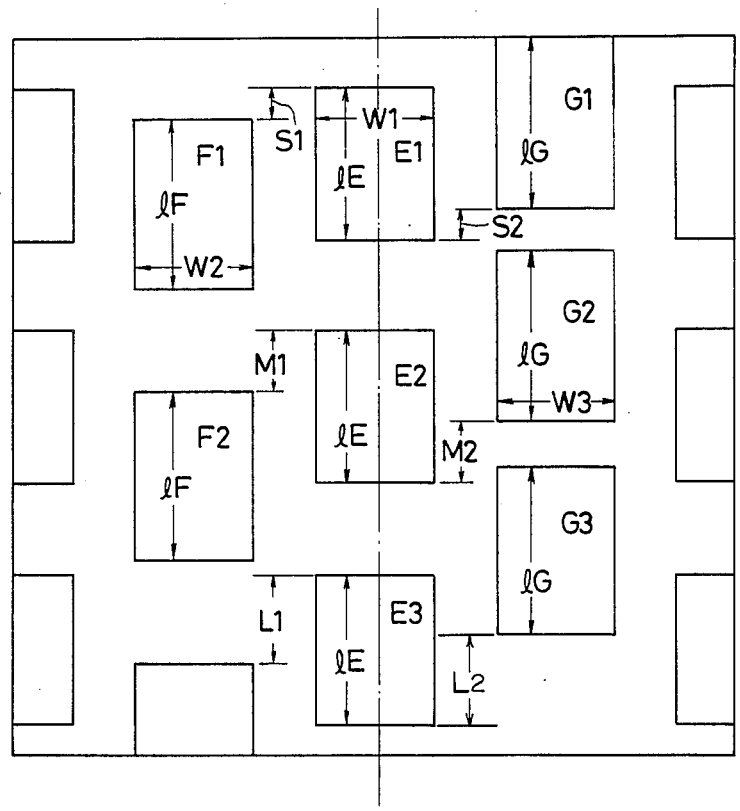

FIG. 2 shows another example of this invention.

The tread pattern is composed of a basic block line (E) and phase-difference block lines (F and G) arranged on both sides of the basic block line (E). The basic block line (E) is made up of unit blocks (E1, E2, E3, ...) arranged at a uniform pitch in the circumferential direction. Each of the phase-difference block lines is made up of unit blocks which are shifted in the opposite direction with respect to the individual unit blocks in the basic block line. The unit blocks (F1, F2 and F3) in the phase-difference block line (F) are shifted downward by S1, M1 and L1, respectively, with respect to the unit blocks (E1, E2 and E3) in the basic block line (E), whereas the unit blocks (G1, G2 and G3) in the phase-difference block line (G) are shifted upward. The unit blocks should be constructed such that S1=S2, M1=M2 and L1=L2 and that the length le in the circumferential direction of the unit blocks (E1, E2 and E3) in the basic block line is smaller than the length in the circumferential direction of the unit blocks (F1, F2, F3, ...) and the unit blocks (G1, G2, G3, ...) in the respective phase-difference block lines (F and G). Table 2 below shows the actual dimensions employed for a 4.60-18 tire for motorcycles.

TABLE 2

| Basic block line E | le: 25 mm | | | | | width W1: 20 mm | | | | | |
|---|---|---|---|---|---|---|---|---|---|---|---|
| Phase-difference block lines F and G | lf, lg: 28 mm | | | | | width W2, W3: 20 mm | | | | | |
| Blocks F | S | M | L | M | S | M | L | M | S | M | L | M |
| Blocks G | -S | -M | -L | -M | -S | -M | -L | -M | -S | -M | -L | -M |
| Phase difference | 5 | 10 | 15 | 10 | 5 | 10 | 15 | 10 | 5 | 10 | 15 | 10 |
| Number of blocks | 6 | 2 | 5 | 6 | 5 | 4 | 4 | 1 | 4 | 5 | 6 | 3 |

EXAMPLE

Figure 3:
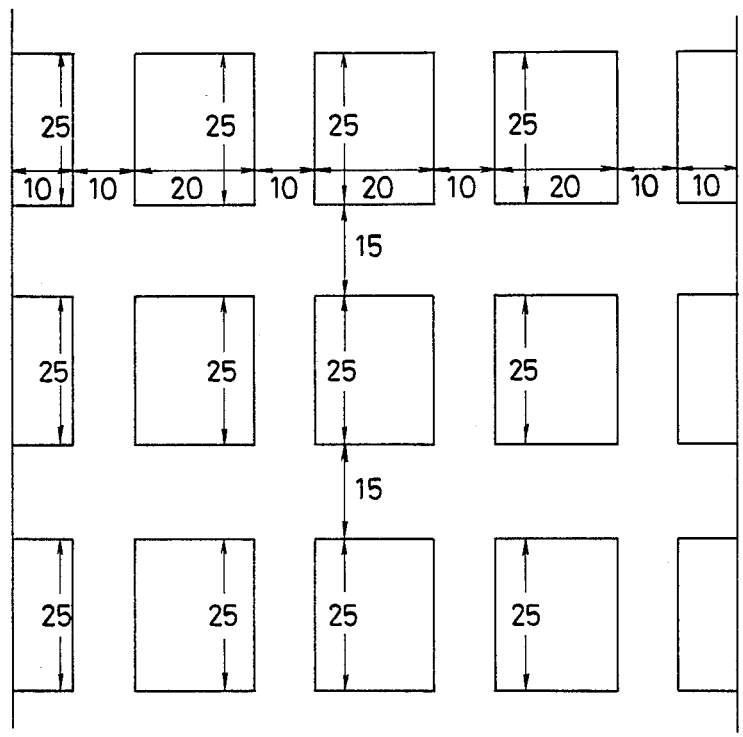
FIG. 3 is a partial plan view of the tread of a conventional tire.

A 4.60-18 tire for motorcycles having the tread pattern as specified in Table 1 was made for trial, and for comparison, a tire of the same size having the tread pattern as shown in FIG. 3 was made for trial. Noise test was conducted according to the tire noise test method provided in JASO.C606 under the conditions of air pressure 1.75 kgf/cm$^2$ and load 100 kgf. A sound collecting microphone was placed just beside the tire 50 cm away from the center of the tire width and 25 cm above the contacting surface. The test tire was turned on the drum installed in an anechoic room. Incidentally, the tires used in the example and comparative example are the same in tread pattern except the phase difference.

Figure 4:
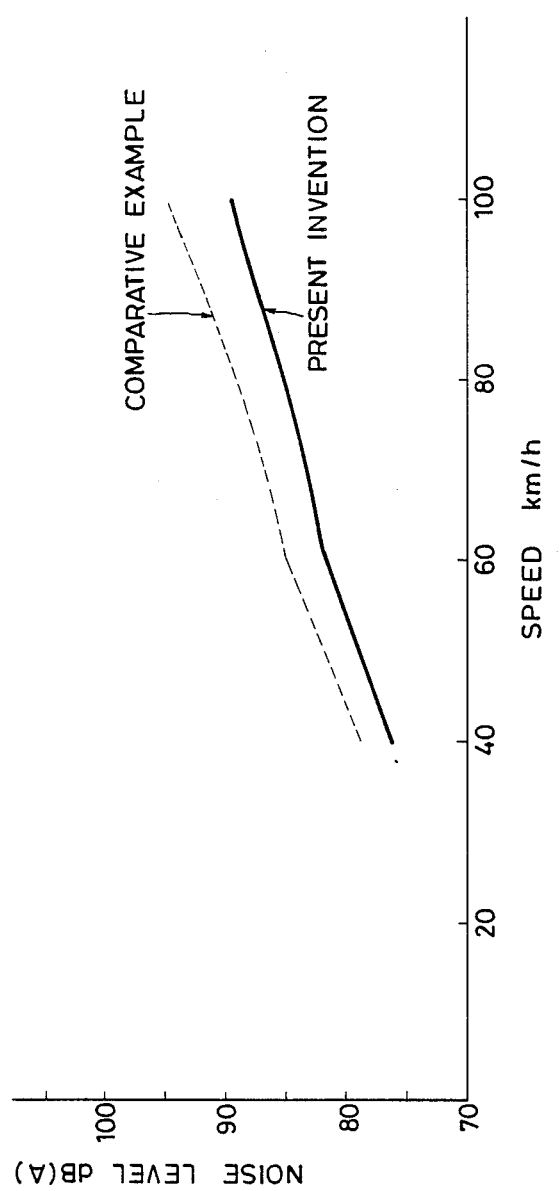
FIG. 4 is a graph showing the relationship between the speed and the noise level.

It was found that the tire of this invention has a lower noise level than that used in the comparative example, as shown in FIG. 4.

In the case of a tire having the tread pattern composed of a plurality of block lines, the sound resulting from the road contacting of blocks is made to have different frequencies if the arrangement of unit blocks are shifted from one another. This leads to a decrease in absolute value of noise level and a dispersion of noise frequencies.

We claim:

1. A low-noise tire comprising
a plurality of block lines running in the circumferential direction of the tire,
said block lines being parallel to each other and spaced from each other,
said block lines including a basic block line, a first side block line and a second side block line,
said basic block line being adjacent and between said first side block line and said second side block line,
said basic block line being located along the equator of the tire and being made up of basic blocks of uniform circumferential length with a first uniform spacing between said basic blocks,
said first side block line being made up of first blocks of uniform circumferential length, said first blocks being of a different length than said basic blocks,
said second side block line being made up of second blocks of uniform circumferential length, said second blocks being of a different length than said basic blocks and said first blocks,
said first blocks being offset with regard to the basic blocks in the circumferential direction by an offset consisting of two or three different shift lengths which are repeated regularly or randomly around the tire circumference,
said second blocks being offset with regard to the basic blocks in the circumferential direction by an offset consisting of two or three different shift lengths which are repeated regularly or randomly around the tire circumference.

2. A low-noise tire as set forth in claim 1, wherein each of said basic blocks is smaller in circumferential length than each of said first and second blocks.

3. A low-noise tire comprising
a plurality of block lines running in the circumferential direction of the tire,
said block lines being parallel to each other and spaced from each other,
said block lines including a basic block line, a first side block line and a second side block line, said basic block line being adjacent and between said first side block line and said second side block line,
said basic block line being located along the equator of the tire and being made up of basic blocks of uniform circumferential length with a uniform spacing between said basic blocks,
said first side block line being made up of first blocks of uniform circumferential length, said first blocks being a different length than said basic blocks,
said first blocks being offset with regard to said basic blocks in the circumferential direction,
said offset of said first blocks consisting of three different shift lengths which are repeated regularly or randomly around the tire circumference,
said second side block line being made up of second blocks of uniform circumferential length, said second blocks being of a different length than said basic blocks and said first blocks,
said second blocks being offset with regard to said basic blocks in the circumferential direction, and
said offset of said second blocks consisting of two different shift lengths which are repeated regularly or randomly around the tire circumference.

4. A low-noise tire comprising
a plurality of block lines running in the circumferential direction of the tire,
said block lines being parallel to each other and spaced from each other,
said block lines including a basic block line,
a first side block line and a second side block line, said basic block line being adjacent and between said first side block line and said second side block line,
said basic block line being located along the equator of the tire and being made up of basic blocks of uniform circumferential length with a uniform spacing between said basic blocks,
said first side block line being made up of first blocks of uniform circumferential length,
said second side block line being made up of second blocks of uniform circumferential length, said basic blocks each having an upper edge and a lower edge, said first blocks being offset in the circumferential direction with regard to said basic blocks, said offset of said first blocks consisting of three different shift lengths which are repeated regularly or randomly around the tire circumference, said second blocks being offset in the circumferential direction with regard to said basic blocks, and said offset of said second blocks consisting of three different shift lengths which are repeated regularly or randomly around the tire circumference.

* * * * *